United States Patent
Cui et al.

(10) Patent No.: US 12,445,922 B2
(45) Date of Patent: Oct. 14, 2025

(54) TECHNOLOGIES FOR HANDOVER PROCEDURES

(71) Applicant: Apple Inc., Cupertino, CA (US)

(72) Inventors: Jie Cui, San Jose, CA (US); Qiming Li, Beijing (CN); Dawei Zhang, Saratoga, CA (US); Hong He, San Jose, CA (US); Huaning Niu, San Jose, CA (US); Manasa Raghavan, Sunnyvale, CA (US); Xiang Chen, Campbell, CA (US); Yang Tang, San Jose, CA (US); Yushu Zhang, Beijing (CN); Zhibin Wu, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 953 days.

(21) Appl. No.: 17/598,229

(22) PCT Filed: Jul. 29, 2021

(86) PCT No.: PCT/CN2021/109316
§ 371 (c)(1),
(2) Date: Sep. 24, 2021

(87) PCT Pub. No.: WO2022/205710
PCT Pub. Date: Oct. 6, 2022

(65) Prior Publication Data
US 2023/0328606 A1    Oct. 12, 2023

(30) Foreign Application Priority Data
Apr. 1, 2021    (WO) ............... PCT/CN2021/085051

(51) Int. Cl.
*H04W 36/08*    (2009.01)
*H04W 36/00*    (2009.01)

(52) U.S. Cl.
CPC ....... *H04W 36/08* (2013.01); *H04W 36/0069* (2018.08); *H04W 36/00725* (2023.05)

(58) Field of Classification Search
None
See application file for complete search history.

(56) References Cited

U.S. PATENT DOCUMENTS

| 11,962,541 B2 * | 4/2024 | Xiao | H04L 27/2605 |
| 2021/0167928 A1 * | 6/2021 | Xiao | H04L 1/1896 |

(Continued)

FOREIGN PATENT DOCUMENTS

| CN | 107690163 | 2/2018 |
| CN | 107852653 | 3/2018 |

(Continued)

OTHER PUBLICATIONS

International Patent Application No. PCT/CN2021/109316, International Preliminary Report on Patentability, Oct. 12, 2023, 5 pages.

(Continued)

*Primary Examiner* — Mariela Vidal Carpio
(74) *Attorney, Agent, or Firm* — Kilpatrick Townsend & Stockton LLP

(57) ABSTRACT

Provided is a method for a user equipment (UE), comprising: performing, based on a command for a handover (HO) with a primary secondary cell (PSCell), an HO of a target primary cell (PCell) and an addition of a target PSCell; and adjusting a radio frequency (RF) for the HO of the target PCell according to a reference signal (RS) occasion for the (Continued)

HO of the target PCell, and an RF for the addition of the target PSCell according to an RS occasion for the addition of the target PSCell.

20 Claims, 10 Drawing Sheets

(56) References Cited

U.S. PATENT DOCUMENTS

| | | | | |
|---|---|---|---|---|
| 2021/0400760 | A1* | 12/2021 | Yang | H04W 76/19 |
| 2022/0386207 | A1* | 12/2022 | Rugeland | H04W 76/15 |
| 2022/0400417 | A1* | 12/2022 | Zhang | H04W 24/08 |
| 2023/0007550 | A1* | 1/2023 | Kumar | H04W 36/00692 |
| 2023/0031500 | A1* | 2/2023 | Hu | H04W 24/10 |
| 2023/0189093 | A1* | 6/2023 | Cui | H04W 36/00698 455/436 |
| 2023/0284099 | A1* | 9/2023 | Xu | H04W 76/12 370/331 |
| 2023/0308960 | A1* | 9/2023 | Selvaganapathy | H04W 36/0058 |
| 2023/0328606 | A1* | 10/2023 | Cui | H04W 36/0069 370/331 |
| 2024/0022980 | A1* | 1/2024 | Da Silva | H04W 36/0085 |
| 2024/0056825 | A1* | 2/2024 | Zhang | H04W 36/0085 |
| 2024/0056917 | A1* | 2/2024 | Kim | H04W 36/00835 |
| 2024/0073755 | A1* | 2/2024 | Yan | H04W 36/0069 |
| 2024/0187956 | A1* | 6/2024 | Hwang | H04W 36/362 |
| 2024/0397379 | A1* | 11/2024 | Wager | H04W 56/001 |

FOREIGN PATENT DOCUMENTS

| | | |
|---|---|---|
| CN | 108702673 | 10/2018 |
| CN | 111465072 | 7/2020 |
| JP | 2015216468 A | 12/2015 |
| WO | 2021015560 | 1/2021 |
| WO | WO-2022155302 A2 * | 7/2022 |

OTHER PUBLICATIONS

International Patent Application No. PCT/CN2021/109316, International Search Report and Written Opinion, Mailed on Dec. 29, 2021, 9 pages.
WF on further RRM enhancement for NR and MR-DC—HO with PSCell, 3GPP TSG-RAN4 Meeting #99e, R4-2108045, May 19-27, 2021, 17 pages.
3rd Generation Partnership Project; Technical Specification Group Radio Access Network; NR; Requirements for support of radio resource management (Release 17), 3GPP TS 38.133 V17.0.0, Dec. 2020, 2400 pages.
Correction on Handling of Scell(S) During Make Before Break Handover, Qualcomm Incorporated, 3rd Generation Partnership Project Technical Specification Group Radio Access Network Working Group2 #107 R2-1911610, Aug. 26-30, 2019, 18 pages.
Discussion on Multiple Scell Activation, MediaTek Inc., 3rd Generation Partnership Project Technical Specification Group Radio Access Network Working Group4 Meeting #94-e-Bis, R4-2003502, Apr. 20-30, 2020, pp. 2-15.
RRM Requirement for Handover With PSCell, Apple, R4-2100193, 3rd Generation Partnership Project, Mobile Competence Centre, Jan. 15, 2021, pp. 1-7.
Views on Specifying the Requirements for Ho With Pscell, Qualcomm CDMA Technologies, 3rd Generation Partnership Project Technical Specification Group Radio Access Network Working Group4 #98_e R4-2102625, Jan. 25-Feb. 5, 2021, 5 pages.
WF on further RRM enhancement for NR and MR-DC—Handover with PSCell, Apple, R4-2103673, 3rd Generation Partnership Project, Mobile Competence Centre, Feb. 9, 2021, pp. 1-12.
European Patent Application No. 21934354.8, Extended European Search Report, Jul. 26, 2024, 10 pages.
Japan Patent Application No. 2023-559115, Office Action, Sep. 13, 2024, 8 pages.
China Patent Application No. 202180005686.1, Office Action, Aug. 12, 2025, 8 pages.

* cited by examiner

TECHNOLOGIES FOR HANDOVER PROCEDURES

CROSS REFERENCES TO RELATED APPLICATIONS

This application is a 371 U.S. National Phase of PCT International Patent Application No. PCT/CN2021/109316, filed Jul. 29, 2021, which claims the benefit of PCT International Patent Application No. PCT/CN2021/085051, filed Apr. 1, 2021, which are hereby incorporated by reference in their entireties for all purposes.

TECHNICAL FIELD

This application relates generally to wireless communication systems, and more specifically to user equipment (UE) radio frequency (RF) adjustment during handover (HO) with primary secondary cell (PSCell).

BACKGROUND

Wireless mobile communication technology uses various standards and protocols to transmit data between a base station and a wireless mobile device. Wireless communication system standards and protocols can include, but not limited to, the 3rd Generation Partnership Project (3GPP) long term evolution (LTE); fifth-generation (5G) 3GPP new radio (NR) standard; technologies beyond 5G. In fifth generation (5G) wireless radio access networks (RANs), the based station may include an RAN Node such as a 5G Node, new radio (NR) node or g Node B (gNB), which communicate with a wireless communication device, also known as user equipment (UE).

SUMMARY

According to an aspect of the present disclosure, A method for a user equipment (UE), comprising: performing, based on a command for a handover (HO) with a primary secondary cell (PSCell), an HO of a target primary cell (PCell) and an addition of a target PSCell; adjusting a radio frequency (RF) for the HO of the target PCell according to a reference signal (RS) occasion for the HO of the target PCell, and an RF for the addition of the target PSCell according to an RS occasion for the addition of the target PSCell.

According to an aspect of the present disclosure, an apparatus for a user equipment (UE) is provided that comprises one or more processors configured to perform steps of the method as describe above.

According to an aspect of the present disclosure, a computer readable medium having computer programs stored thereon is provided, which, when executed by one or more processors, cause an apparatus to perform steps of the method as describe above.

According to an aspect of the present disclosure, an apparatus for a communication device is provided that comprises means for performing steps of the method as describe above.

According to an aspect of the present disclosure, a computer program product comprising computer programs which, when executed by one or more processors, cause an apparatus to perform steps of the method as describe above.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure.

DETAILED DESCRIPTION

In the present disclosure, a "base station" can include an RAN Node such as an Evolved Universal Terrestrial Radio Access Network (E-UTRAN) Node B (also commonly denoted as evolved Node B, enhanced Node B, eNodeB, or eNB) and/or Radio Network Controller (RNC), and/or a 5G Node, new radio (NR) node or g Node B (gNB), which communicate with a wireless communication device, also known as user equipment (UE). Although some examples may be described with reference to any of E-UTRAN Node B, an eNB, an RNC and/or a gNB, such devices may be replaced with any type of base station.

In the related art, the interruption as to the HO with PSCell depends on the UE implementation of RF adjustment, e.g., RF tuning/retuning, bandwidth (BW) change and so on. During the HO with the PSCell addition/change, both the HO and the PSCell addition/change are performed by the UE, and the UE needs to coordinate the RF adjustments for both to minimize the performance loss.

Aiming to this, it is provided by the present disclosure the UE RF adjustment during HO with PSCell. Various aspects of the present disclosure will be described below in conjunction with the accompanying drawings.

Figure 1:
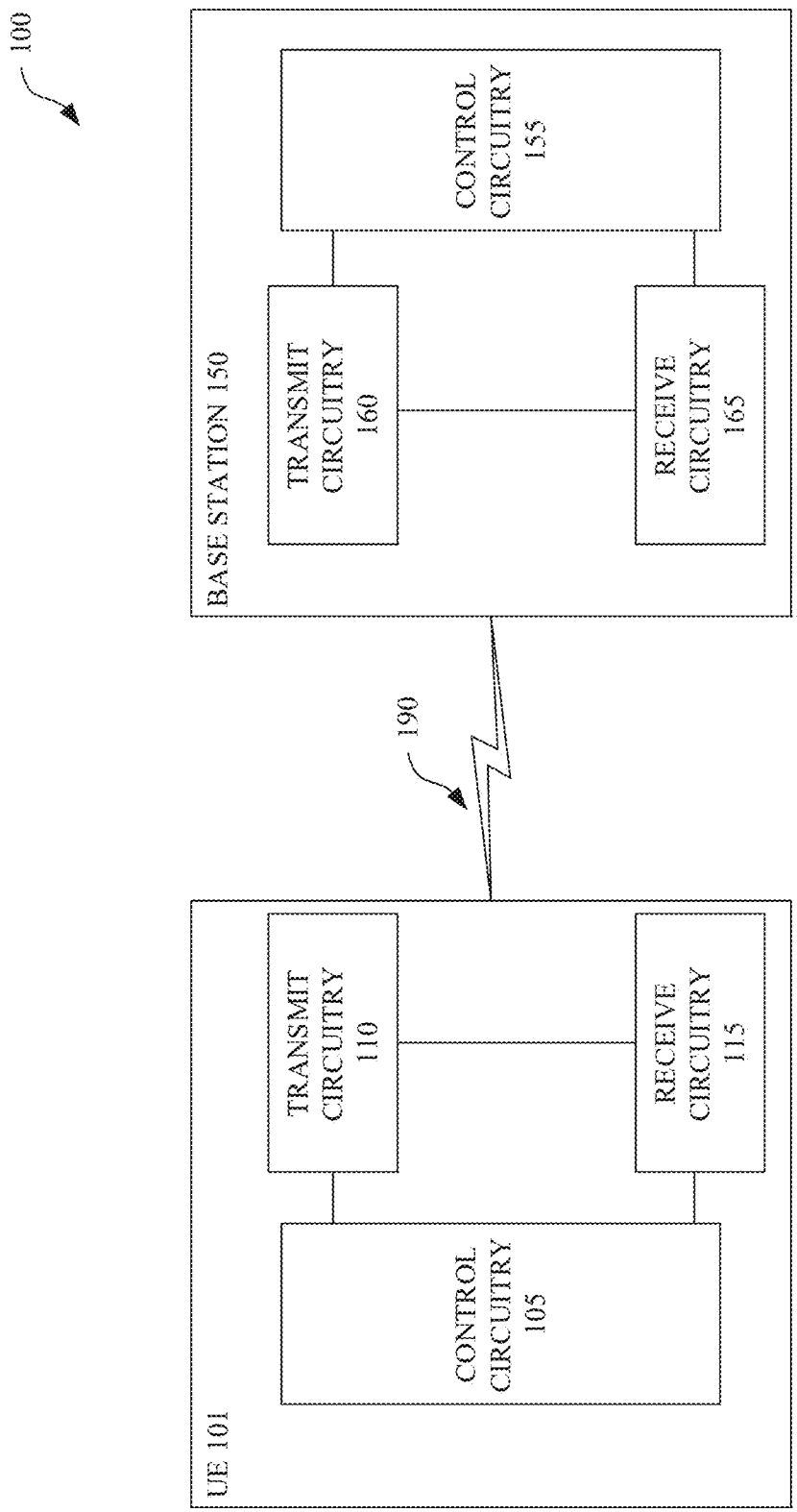
FIG. 1 is a block diagram of a system including a base station and a user equipment (UE) in accordance with some embodiments.

FIG. 1 is a block diagram of a system including a base station and a user equipment (UE) in accordance with some embodiments. FIG. 1 illustrates a wireless network 100, in accordance with some embodiments. The wireless network 100 includes a UE 101 and a base station 150 connected via an air interface 190.

The UE 101 and any other UE in the system may be, for example, laptop computers, smartphones, tablet computers, printers, machine-type devices such as smart meters or specialized devices for healthcare monitoring, remote security surveillance, an intelligent transportation system, or any other wireless devices with or without a user interface. The base station 150 may provide network connectivity to a broader network (not shown) to the UE 101 via the air interface 190 in a base station service area provided by the base station 150. In some embodiments, such a broader network may be a wide area network operated by a cellular network provider, or may be the Internet. Each base station service area associated with the base station 150 is supported by antennas integrated with the base station 150. The service areas are divided into a number of sectors associated with certain antennas. Such sectors may be physically associated with fixed antennas or may be assigned to a physical area with tunable antennas or antenna settings adjustable in a beamforming process used to direct a signal to a particular sector. One embodiment of the base station 150, for example, includes three sectors each covering a 120 degree area with an array of antennas directed to each sector to provide 360 degree coverage around the base station 150.

The UE 101 includes control circuitry 105 coupled with transmit circuitry 110 and receive circuitry 115. The transmit circuitry 110 and receive circuitry 115 may each be coupled with one or more antennas. The control circuitry 105 may be adapted to perform operations associated with MTC. In some embodiments, the control circuitry 105 of the UE 101 may perform calculations or may initiate measurements associated with the air interface 190 to determine a channel quality of the available connection to the base station 150. These calculations may be performed in conjunction with control circuitry 155 of the base station 150. The transmit circuitry 110 and receive circuitry 115 may be adapted to transmit and receive data, respectively. The control circuitry 105 may be adapted or configured to perform various operations such as those described elsewhere in this disclosure related to a UE. The transmit circuitry 110 may transmit a plurality of multiplexed uplink physical channels. The plurality of uplink physical channels may be multiplexed according to time division multiplexing (TDM) or frequency division multiplexing (FDM). The transmit circuitry 110 may be configured to receive block data from the control circuitry 105 for transmission across the air interface 190. Similarly, the receive circuitry 115 may receive a plurality of multiplexed downlink physical channels from the air interface 190 and relay the physical channels to the control circuitry 105. The uplink and downlink physical channels may be multiplexed according to TDM or FDM. The transmit circuitry 110 and the receive circuitry 115 may transmit and receive both control data and content data (e.g., messages, images, video, et cetera) structured within data blocks that are carried by the physical channels.

FIG. 1 also illustrates the base station 150, in accordance with various embodiments. The base station 150 circuitry may include control circuitry 155 coupled with transmit circuitry 160 and receive circuitry 165. The transmit circuitry 160 and receive circuitry 165 may each be coupled with one or more antennas that may be used to enable communications via the air interface 190.

The control circuitry 155 may be adapted to perform operations associated with MTC. The transmit circuitry 160 and receive circuitry 165 may be adapted to transmit and receive data, respectively, within a narrow system bandwidth that is narrower than a standard bandwidth structured for person to person communication. In some embodiments, for example, a transmission bandwidth may be set at or near 1.4 MHz. In other embodiments, other bandwidths may be used. The control circuitry 155 may perform various operations such as those described elsewhere in this disclosure related to a base station.

Within the narrow system bandwidth, the transmit circuitry 160 may transmit a plurality of multiplexed downlink physical channels. The plurality of downlink physical channels may be multiplexed according to TDM or FDM. The transmit circuitry 160 may transmit the plurality of multiplexed downlink physical channels in a downlink superframe that is comprised of a plurality of downlink subframes.

Within the narrow system bandwidth, the receive circuitry 165 may receive a plurality of multiplexed uplink physical channels. The plurality of uplink physical channels may be multiplexed according to TDM or FDM. The receive circuitry 165 may receive the plurality of multiplexed uplink physical channels in an uplink super-frame that is comprised of a plurality of uplink subframes.

As described further below, the control circuitry 105 and 155 may be involved with measurement of a channel quality for the air interface 190. The channel quality may, for example, be based on physical obstructions between the UE 101 and the base station 150, electromagnetic signal interference from other sources, reflections or indirect paths between the UE 101 and the base station 150, or other such sources of signal noise. Based on the channel quality, a block of data may be scheduled to be retransmitted multiple times, such that the transmit circuitry 110 may transmit copies of the same data multiple times and the receive circuitry 115 may receive multiple copies of the same data multiple times.

Figure 2:
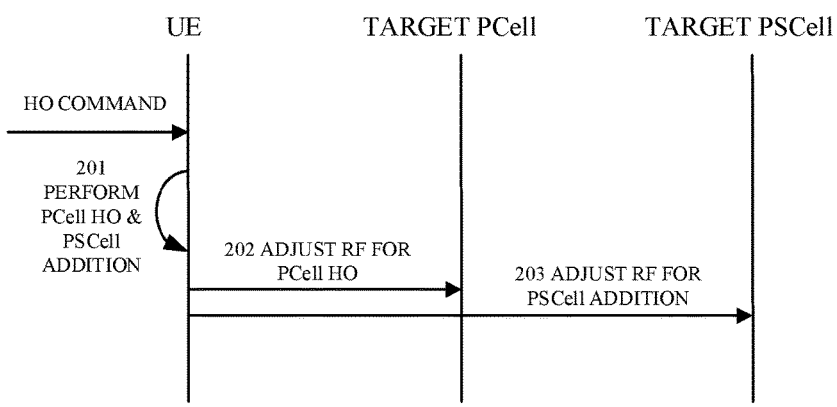
FIG. 2 illustrates a schematic diagram for an exemplary method for a UE in accordance with some embodiments.

FIG. 2 illustrates a schematic diagram for an exemplary method for a UE in accordance with some embodiments.

As shown in the method 200 of FIG. 2, the UE may perform 201, based on a command for a handover (HO) with a primary secondary cell (PSCell), an HO of a target primary cell (PCell) and an addition of a target PSCell. The UE may adjust 202, a radio frequency (RF) for the HO of the target PCell according to a reference signal (RS) occasion for the HO of the target PCell, and adjust 203, an RF for the addition of the target PSCell according to an RS occasion for the addition of the target PSCell.

It is noted that the PSCell addition/change as described in the present disclosure may refer to either the addition of the PSCell or the change of the PSCell. The expression "addition" of the PSCell when used solely in the present disclosure, it is also intended to cover the other scenario, i.e., the "change" of the PSCell.

In some embodiments, the UE may be the UE 101 as described in FIG. 1. The UE may receive the command for the HO from the network side, e.g., from a source PCell.

In some embodiments, the command may be a radio resource control (RRC) command for the HO with PSCell (hereinafter, also indicated as "HO command"). Upon receipt of the command, the UE may start the HO of the target PCell after a predetermined delay time has passed.

In some embodiments, the HO of the target PCell (hereinafter, also indicated as "PCell HO") and the addition of the target PSCell (hereinafter, also indicated as "PSCell addition") may be performed sequentially. The PSCell addition may be performed at the time when the RACH of the PCell HO is completed.

In this case, the UE may avoid adjusting 203 the RF for the PSCell addition during the time period of the PCell HO to keep the PCell HO procedure unimpacted. This means the UE may adjust 203 the RF for the PSCell addition only after the PCell HO is completed. Further details will be described below in reference to FIG. 3.

In some embodiments, the PCell HO and the PSCell addition may be performed in parallel. The PSCell addition may be performed in parallel with the RACH of the HO after the HO command is decoded.

In this case, the UE may adjust 202 the RF for the PCell HO during a time period of the PCell HO and adjust 203 the RF for the PSCell addition during a time period of the PSCell addition. Further details will be described below in reference to FIGS. 4A to 4C, 5A, 5B and 6A, 6B.

In some embodiments, the RS occasion may be a synchronized signal block (SSB) or channel state information-reference signal (CSI-RS) or RACH (or other channels) occasion. The RS occasion for the PCell HO and the RS occasion for the PSCell addition may refer to the downlink (DL), i.e., DL RS occasion.

In some embodiments, the UE may adjust 202 the RF for the PCell HO to perform at least one of tuning or retuning an RF chain, powering on an RF chain and widening a coverage of the RF in the frequency domain to contain the RS occasion for the target PCell.

Similarly, the UE may adjust 203 the RF for the addition of the target PSCell to perform at least one of tuning or retuning an RF chain, powering on an RF chain and widening a coverage of the RF in the frequency domain to contain the RS occasion for the target PSCell.

According to the present disclosure, since the RF adjustment for the PCell HO and the RF adjustment for the PSCell addition are controlled through the timing of the respective RS occasions, the interruptions during the time period of the PCell HO may be avoided or minimized.

Figure 3:
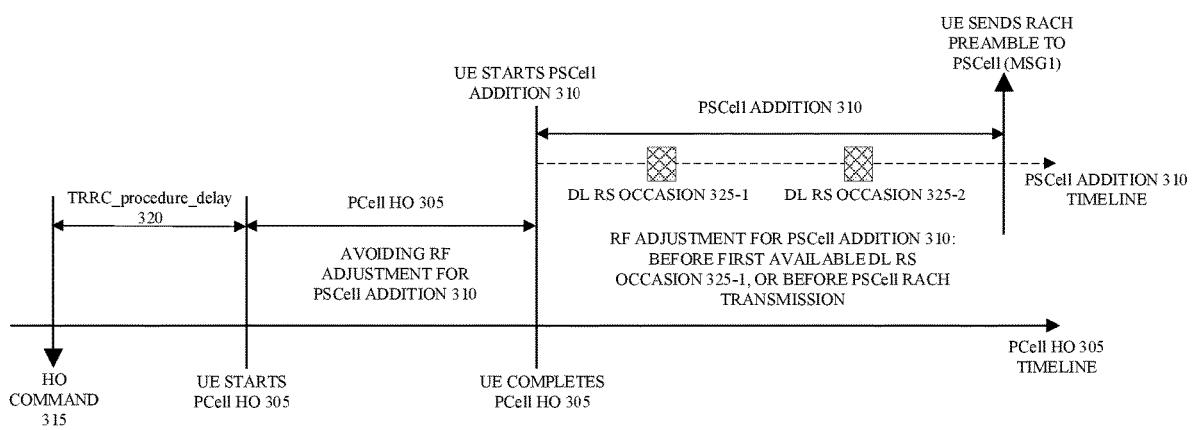
FIG. 3 illustrates the RF adjustment of the UE in the sequential processing in accordance with some embodiments.

FIG. 3 illustrates the RF adjustment of the UE in the sequential processing in accordance with some embodiments.

As shown in FIG. 3, the PCell HO 305 and the PSCell addition 310 may be performed sequentially. The PSCell addition 310 may be performed at the time when the UE completes the PCell HO 305, that is, at the time when the RACH of the PCell HO 305 is completed. In other words, the UE may start the PSCell addition 310 at the time when it completes the PCell HO 305.

Therefore, the time period of the PCell HO 305 ranges from the time point that the UE starts the PCell HO 305 to the time point that the UE starts the PSCell addition 310. The time period of the PSCell addition ranges from the time point that the UE starts the PSCell addition 310 to the time points that the UE sends the RACH preamble to the PSCell (msg1).

The UE may receive the HO command 315 from the network side, e.g., from a source PCell. Upon receipt of the HO command 315, The UE may start the PCell HO 305 after a delay time $T_{RRC\_procedure\_delay}$ 320 has passed.

Due to the fact that there might be some RS occasion for the PCell synchronization or tracking during the time period of the PCell HO 305, the performing of RF adjustment for the PSCell addition 310 would interrupt the reception or transmission of such RS occasion. The RS occasion may be, e.g., a synchronized signal block (SSB) or channel state information-reference signal (CSI-RS) or RACH (or other channels) occasion.

According to the present disclosure, the UE may avoid adjusting the RF for the PSCell addition 310 during the time period of the PCell HO 305. That is, the UE may adjust the RF for PSCell addition 310 only after the PCell HO 305 is completed. Here, a completion point of the PCell HO 305 may be, for example, the PCell RACH timing or the PCell random access response (RAR) reception timing.

In this way, the RS occasion during the time period of the PCell HO 305 may be unimpacted.

In some embodiments, the UE may adjust the RF for the PSCell addition 310 prior to the first available RS occasion 325-1 for the PSCell addition 310. For example, the RS occasion for the PCell HO and the RS occasion for the PSCell addition may refer to the downlink (DL), i.e., DL RS occasion.

As shown in FIG. 3, the UE may adjust the RF for the PSCell addition 310 within the time range from the time point that the UE starts the PSCell addition 310 to the time point of the first DL RS occasion 325-1.

Thus, the interruption may be limited within the time range from the start of the PSCell addition 310 (i.e., the completion point of the PCell HO 305) to the first available DL RS occasion 325-1 for the PSCell addition.

In some embodiments, the UE may adjust the RF for the PSCell addition 310 before the RACH transmission of the PSCell where a predetermined number of the RS occasion for the PSCell addition 310 have been measured.

It is understood that two DL RS occasion 325-1 and 325-2 have been shown in FIG. 3 for purpose of illustration. However, there may be more DL RS occasion or less DL RS occasion than FIG. 3. The RACH transmission of the PSCell may happen at the time when a predetermined number of the RS occasion for the PSCell addition 310 have been measured.

Thus, the interruption may be limited within the time range from the start of the PSCell addition 310 (i.e., the completion point of the PCell HO 305) to the RACH transmission of the PSCell.

According to the embodiment of the present disclosure, when the sequential processing of the PCell HO and the PSCell addition is performed, the UE may adjust the RF for the PSCell addition only after the PCell HO is completed. Thus, the RS occasion during the time period of the PCell HO may be unimpacted.

Figure 4A:
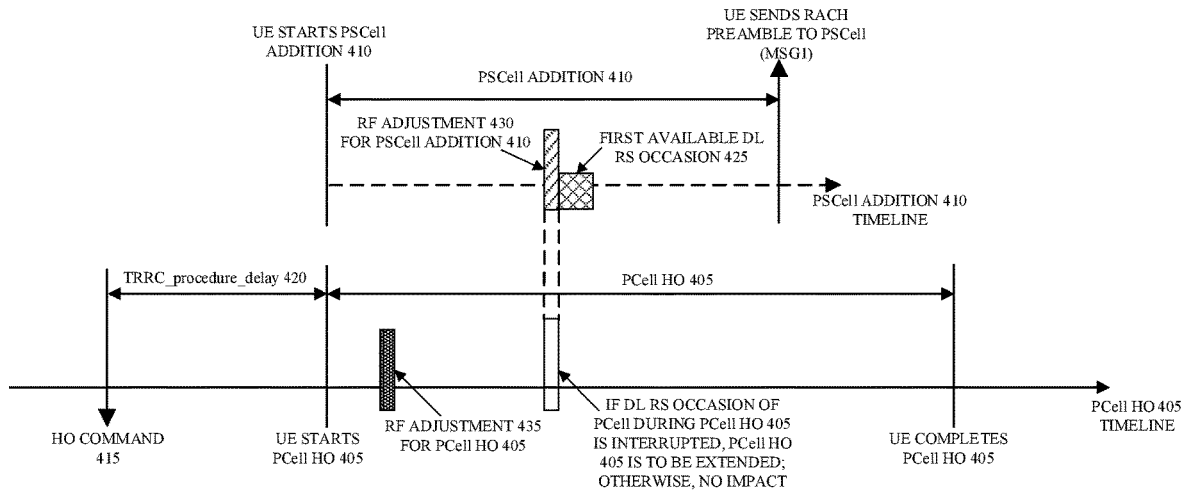
FIGS. 4A to 4C illustrate the RF adjustment of the UE in the parallel processing in accordance with an embodiment.
Figure 4B:
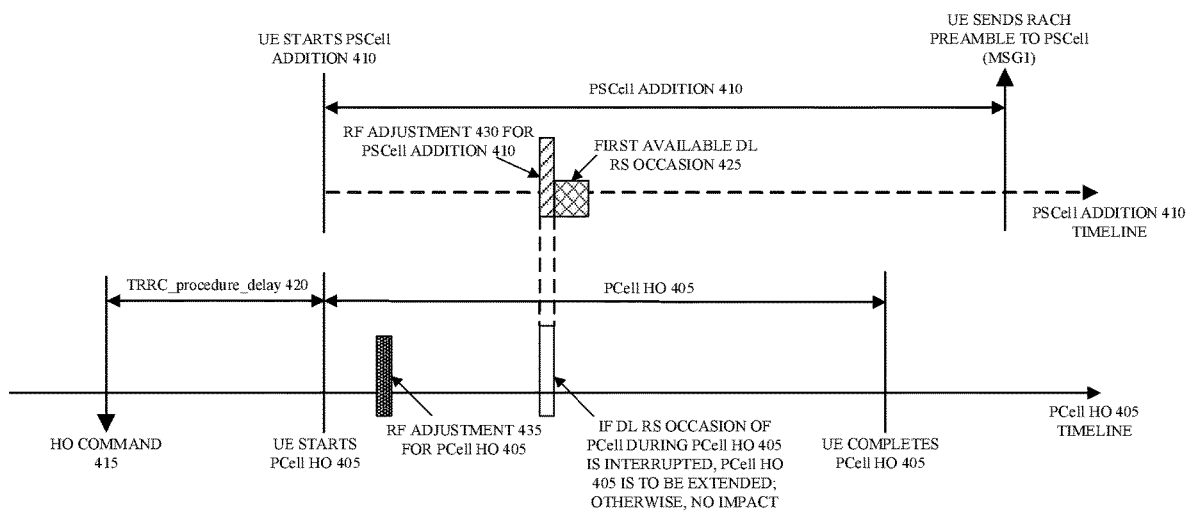
Figure 4C:
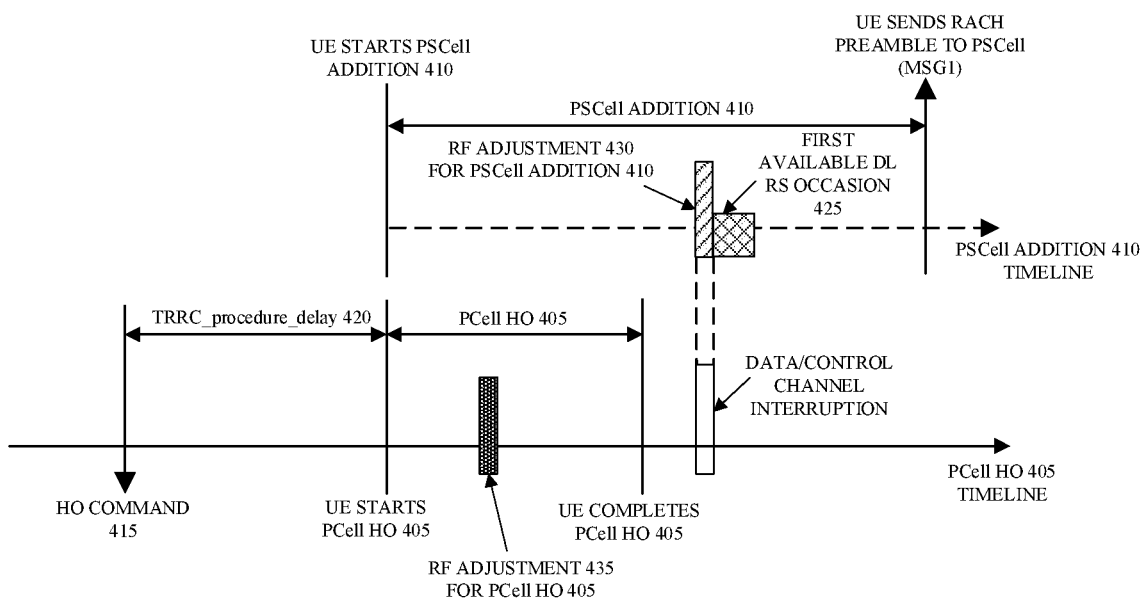

FIGS. 4A to 4C illustrate the RF adjustment of the UE in the parallel processing in accordance with an embodiment.

As shown in FIGS. 4A to 4C, the PCell HO 405 and the PSCell addition 410 may be performed in parallel. This means the PSCell addition 410 is performed in parallel with the PCell HO 405 at the time when the HO command 415 is decoded, i.e., after a delay time $T_{RRC\_procedure\_delay}$ 420 has passed. That is, the time point that the UE starts PCell HO 405 is the same as the time point that the UE starts the PSCell addition 410. In this case, the UE adjusts the RF for the PCell HO 405 during a time period of the PCell HO 405 and the RF for the PSCell addition 410 during a time period of PSCell addition 410.

In some embodiments, the RF adjustment of the PCell HO 405 may be independent from the RF adjustment of the PSCell addition 410. This may lead to various scenarios. FIG. 4A shows a scenario where the time period of the PCell HO 405 is longer than that of the PSCell addition 410, while FIGS. 4B and 4C show a scenario where the time period of the PCell HO 405 is shorter than that of the PSCell addition 410. Hereinafter, the two scenarios will be discussed respectively, and the similar features as in FIG. 3 will be omitted.

PCell HO 405 Longer than PSCell Addition 410

As shown in FIG. 4A, the UE may adjust the RF for the PSCell addition 410 during the time period of PSCell addition 410, prior to the first available RS occasion 425 for PSCell addition 410. Thus, the RF adjustment based interruption from the PSCell addition 410 may be located within the time period of the PCell HO 405. In other words, the time duration in which the UE adjusts the RF for the PSCell addition 410 in the PSCell addition 410 timeline may be reflected onto the PCell HO 405 timeline, which is depicted as two dotted lines together with an empty block in FIGS. 4A to 4C). Such reflection might or might not have an impact on the PCell HO 405.

On one hand, when a time duration in which the UE adjusts the RF 430 for the PSCell addition 410 collides with at least one RS occasion for the PCell HO 405 such that the at least one RS occasion for PCell HO 405 is interrupted, the time period of the PCell HO 405 may to be extended. This means that the RF adjustment 430 for the PSCell addition 410 has caused at least one lost RS occasion for the PCell HO 405. In some embodiments, the time period of the PCell HO 405 may to be extended for at least one RS occasion.

On the other hand, when no RS occasion for the PCell HO 405 is interrupted by the RF adjustment 430 for the PSCell addition 410, the time period of the PCell HO 405 may not to be extended.

PCell HO 405 Shorter than PSCell Addition 410

The scenario as shown in FIG. 4B is similar to the scenario as shown in FIG. 4A, where the RF adjustment based interruption from the PSCell addition 410 may be located within the time period of the PCell HO 405.

In this case, similarly as discussed in FIG. 4A, if a time duration in which the UE adjusts the RF 430 for the PSCell addition 410 collides with at least one RS occasion for the PCell HO 405 such that the at least one RS occasion for PCell HO 405 is interrupted, the time period of the PCell HO 405 may to be extended. If no RS occasion for the PCell HO 405 is interrupted by the RF adjustment 430 for the PSCell addition 410, the time period of the PCell HO 405 may not to be extended.

In contrast, as shown in FIG. 4C, the UE may adjust the RF 430 for the PSCell addition 410 after the PCell HO 405 is completed. In this case, the UE interrupts a data channel and/or control channel on the target PCell within a time duration in which the UE adjusts the RF 430 for the PSCell addition 410.

That is, the RF adjustment based interruption from the PSCell addition 410 may be located outside the time period of the PCell HO 405. In this case, such interruption would be assumed as a data and/or control interruption on the PCell.

According to the embodiment of the present disclosure, when the parallel processing of the PCell HO and the PSCell addition is performed, the UE may adjust the RF for the PCell HO during a time period of the PCell HO and the RF for the PSCell addition during a time period of PSCell addition. In this way, the interruptions during the time period of the PCell HO may be avoided or minimized.

Figure 5A:
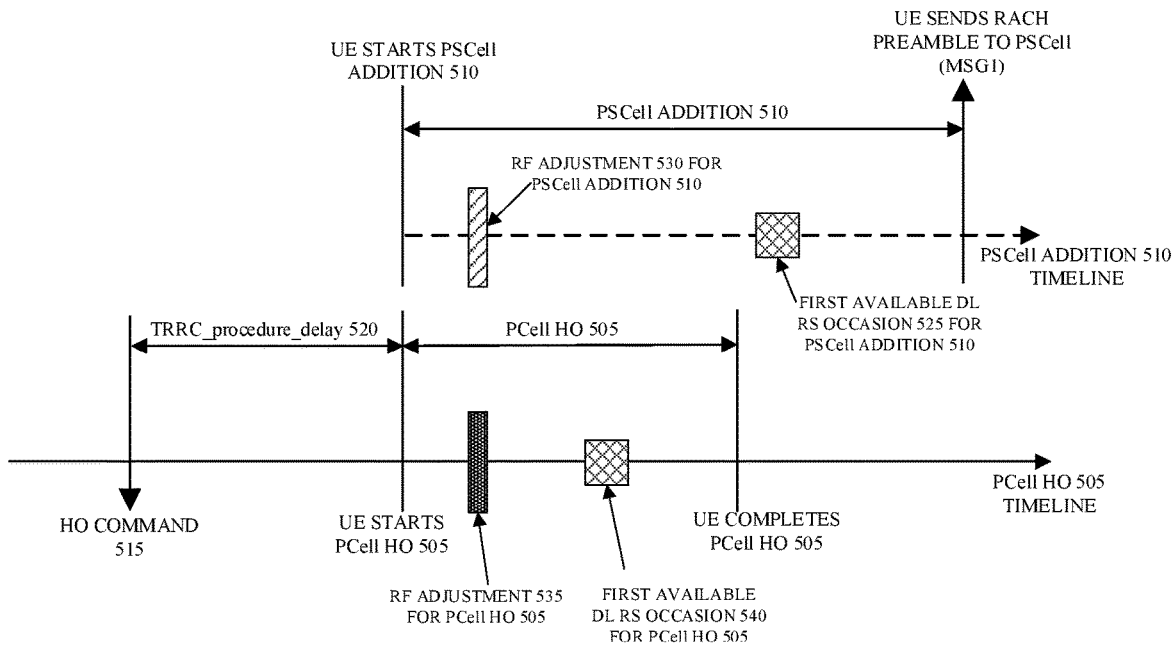
FIGS. 5A and 5B illustrate the RF adjustment of the UE in the parallel processing in accordance with another embodiment.
Figure 5B:
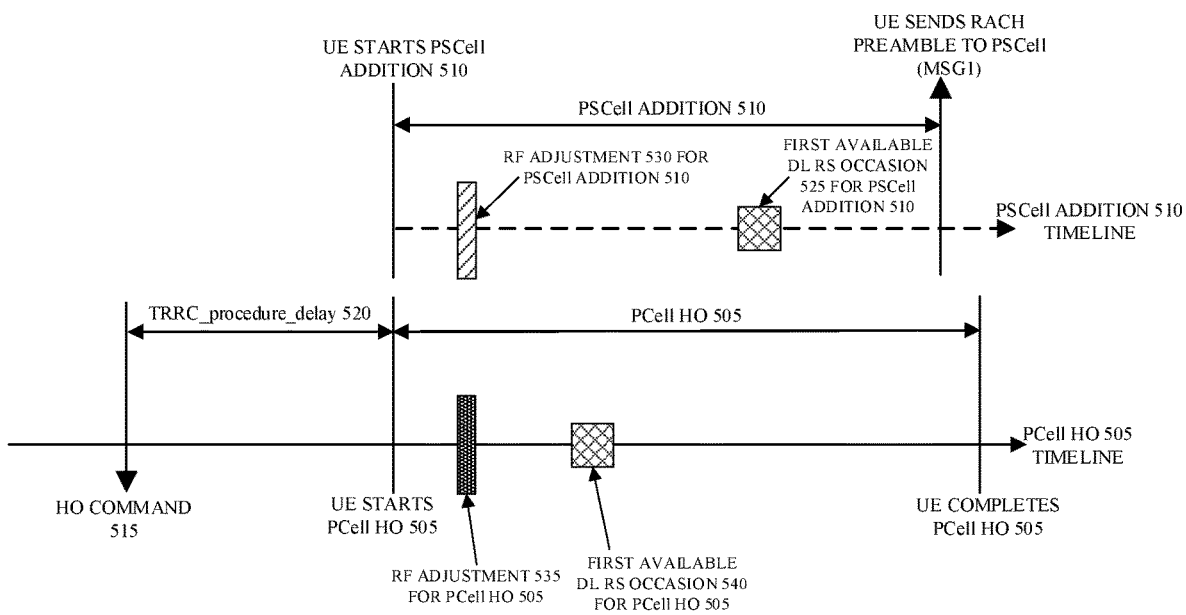

FIGS. 5A and 5B illustrate the RF adjustment of the UE in the parallel processing in accordance with another embodiment.

As shown in FIGS. 5A and 5B, the PCell HO 505 and the PSCell addition 510 may be performed in parallel, and the UE adjusts the RF for the PCell HO 505 during a time period of the PCell HO 505 and the RF for the PSCell addition 510 during a time period of PSCell addition 510. Similarly as described with reference to FIGS. 4A to 4C, the PSCell addition 510 is performed in parallel with the PCell HO 505 at the time when the HO command 515 is decoded, i.e., after a delay time $T_{RRC\_procedure\_delay}$ 520 has passed.

Furthermore, the UE may adjust the RF for the HO of the target PCell and the RF for the addition of the target PSCell in an aligned manner in the time domain. As shown in FIGS. 5A and 5B, the block noted as "RF ADJUSTMENT 530 FOR PSCell ADDITION 510" is aligned with the block noted as "RF ADJUSTMENT 535 FOR PCell HO 505".

FIG. 5A shows a scenario where the time period of the PCell HO 505 is shorter than that of the PSCell addition 510, while FIG. 5B shows a scenario where the time period of the PCell HO 505 is longer than that of the PSCell addition 510. Nevertheless, regardless of the time period of the PCell HO 505 being longer or shorter than the time period of the PSCell addition 510, the UE may coordinate the RF unit between the PCell carrier and the PSCell carrier to align the RF adjustment in the time domain.

In some embodiments, the UE may adjust the RF for the PCell HO 505 and the RF for the PSCell addition 510 simultaneously, prior to an earlier one of a first available RS occasion for the HO of the target PCell and a first available RS occasion for the addition of the target PSCell.

As shown in FIGS. 5A and 5B, the block noted as "FIRST AVAILABLE DL RS OCCASION 540 FOR PCell HO 505" is earlier than the block noted as "FIRST AVAILABLE DL RS OCCASION 525 FOR PSCell ADDITION 510", and thus the blocks noted as "RF ADJUSTMENT 530 FOR PSCell ADDITION 510" and "RF ADJUSTMENT 535 FOR PCell HO 505" are aligned with each other in the time domain prior to the block noted as "FIRST AVAILABLE DL RS OCCASION 540 FOR PCell HO 505".

According to the embodiment of the present disclosure, neither the time period of the PCell HO nor the time period of the PSCell addition is to be extended. Furthermore, after the PCell HO, the data/control channel on the PCell can be interruption free from the PSCell addition.

Figure 6A:
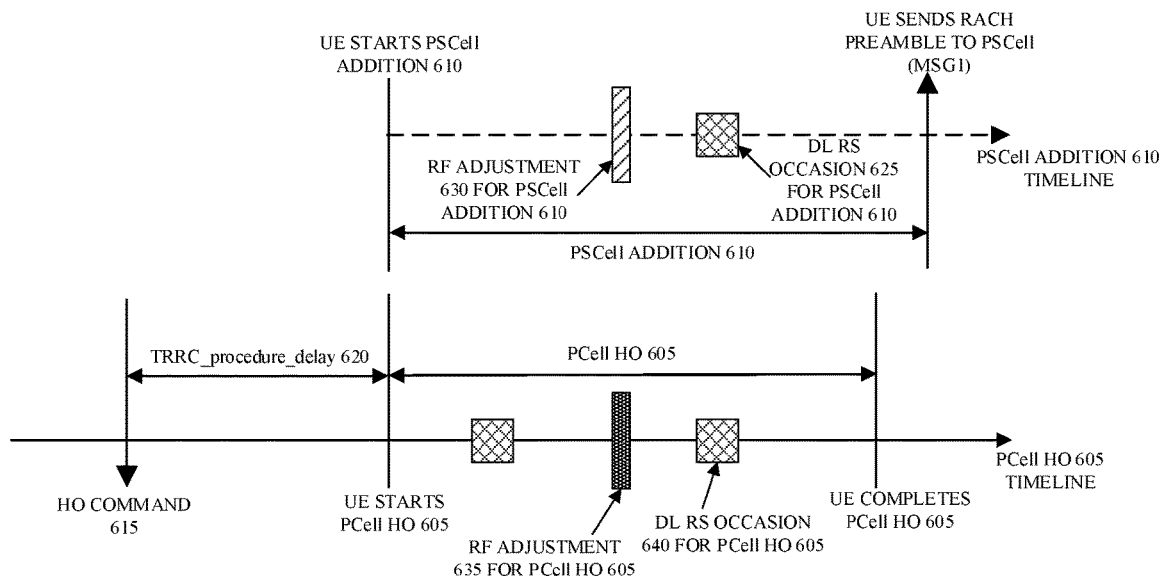
FIGS. 6A and 6B illustrate the RF adjustment of the UE in the parallel processing in accordance with yet another embodiment.
Figure 6B:
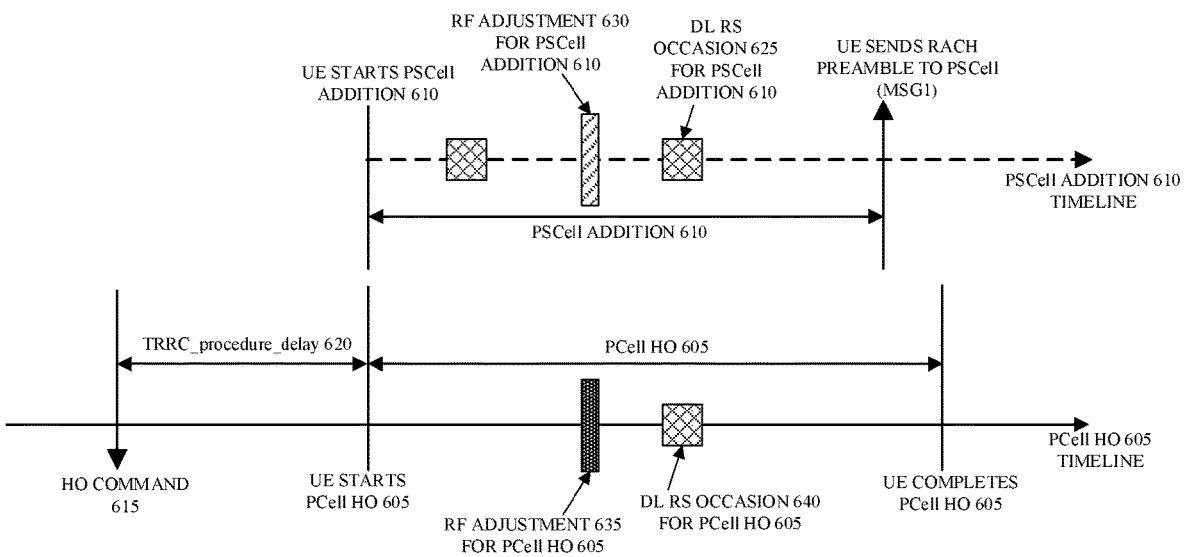

FIGS. 6A and 6B illustrate the RF adjustment of the UE in the parallel processing in accordance with yet another embodiment.

As shown in FIGS. 6A and 6B, the PCell HO 605 and the PSCell addition 610 may be performed in parallel, and the UE adjusts the RF for the PCell HO 605 during a time period of the PCell HO 605 and the RF for the PSCell addition 610 during a time period of PSCell addition 610. Similarly as described with reference to FIGS. 5A and 5B, the PSCell addition 610 is performed in parallel with the PCell HO 605 at the time when the HO command 615 is decoded, i.e., after a delay time $T_{RRC\_procedure\_delay}$ 620 has passed. In particular, the target PCell and the PSCell are intra-band dual connectivity (DC) (share automatic gain control (AGC)).

Furthermore, the UE may adjust the RF for the HO of the target PCell and the RF for the addition of the target PSCell in an aligned manner in the time domain. As shown in FIGS. 6A and 6B, the block noted as "RF ADJUSTMENT 630 FOR PSCell ADDITION 610" is aligned with the block noted as "RF ADJUSTMENT 635 FOR PCell HO 605".

FIG. 6A shows a scenario where the time period of the PCell HO 605 is shorter than that of the PSCell addition 610, while FIG. 6B shows a scenario where the time period of the PCell HO 605 is longer than that of the PSCell addition 610. Nevertheless, regardless of the time period of the PCell HO 605 being longer or shorter than the time period of the PSCell addition 610, the UE may coordinate the RF unit between the PCell carrier and the PSCell carrier to align the RF adjustment in the time domain.

In some embodiments, the UE adjusts the RF for the PCell HO 605 and the RF for the PSCell addition 610 simultaneously, prior to a time point which is a first overlapping between the RS occasion 640 for the PCell HO 605 and the RS occasion 625 for the PSCell addition 610 in the time domain.

As shown in FIGS. 6A and 6B, the block noted as "DL RS OCCASION 625 FOR PSCell ADDITION 610" and block noted as "DL RS OCCASION 640 FOR PCell HO 605" are firstly overlapped in the time domain, and thus the blocks noted as "RF ADJUSTMENT 630 FOR PSCell ADDITION 610" and "RF ADJUSTMENT 635 FOR PCell HO 605" are aligned with each other in the time domain prior to the two blocks.

In the scenario as shown in FIG. 6A, the time period of the PCell HO 605 may be extended if the RS periodicity of the target PCell is smaller than the RS periodicity of the target PSCell, since the UE would use the common RS for the AGC settling and the common RS periodicity would be accordingly used for the determination of the time period of the PCell HO 605.

In the scenario as shown in FIG. 6B, the time period of the PSCell addition 610 may be extended if the RS periodicity of the target PSCell is smaller than the RS periodicity of the target PCell, since the UE would use the common RS for AGC settling and the common RS periodicity would be accordingly used for the determination of the time period of the PSCell addition 610.

According to the embodiment of the present disclosure, the interruptions during the time period of the PCell HO may be avoided or minimized.

Figure 7:
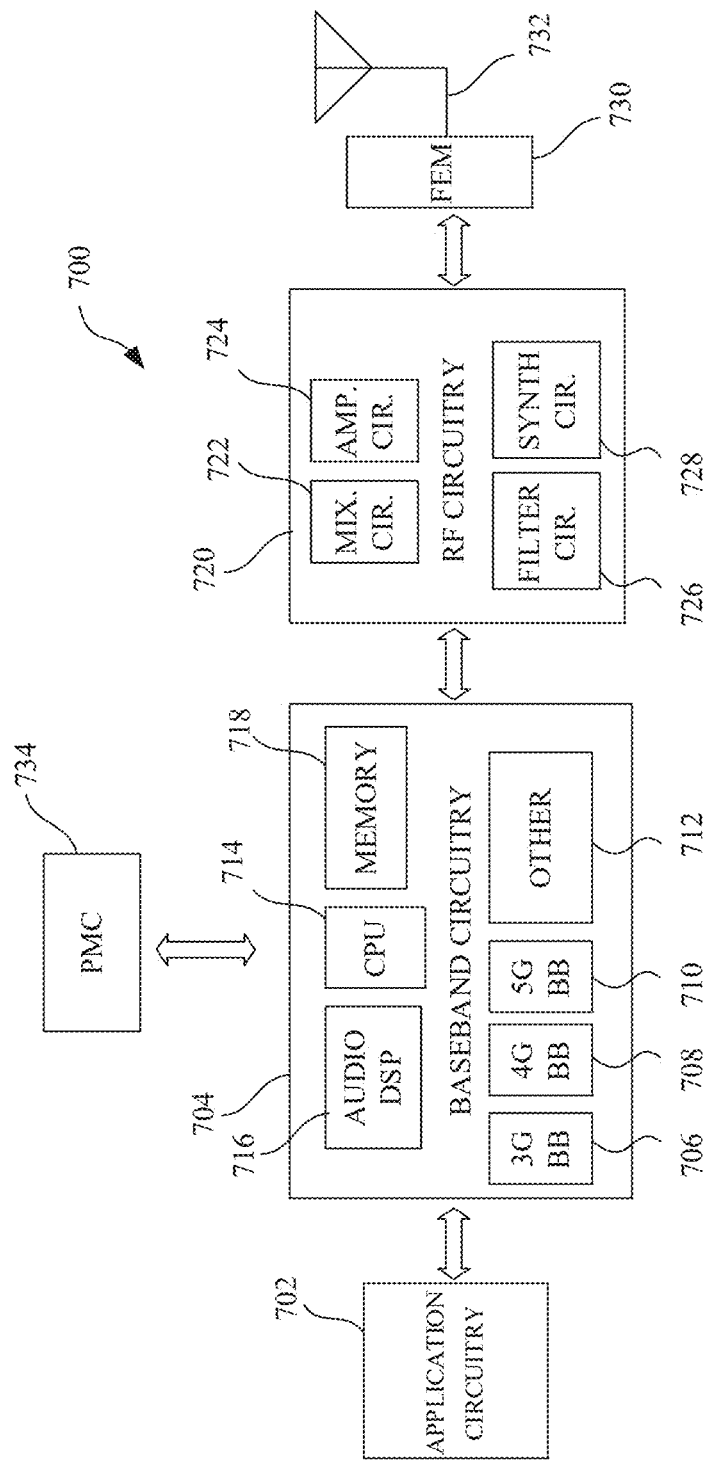
FIG. 7 illustrates a communication device (e.g., a UE or a base station) in accordance with some embodiments.

FIG. 7 illustrates a communication device (e.g., a UE or a base station) in accordance with some embodiments. FIG. 7 illustrates example components of a device 700 in accordance with some embodiments. In some embodiments, the device 700 may include application circuitry 702, baseband circuitry 704, Radio Frequency (RF) circuitry (shown as RF circuitry 720), front-end module (FEM) circuitry (shown as FEM circuitry 730), one or more antennas 732, and power management circuitry (PMC) (shown as PMC 734) coupled together at least as shown. The components of the illustrated device 700 may be included in a UE or a RAN node. In some embodiments, the device 700 may include fewer elements (e.g., a RAN node may not utilize application circuitry 702, and instead include a processor/controller to process IP data received from an EPC). In some embodiments, the device 700 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 702 may include one or more application processors. For example, the application circuitry 702 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 700. In some embodiments, processors of application circuitry 702 may process IP data packets received from an EPC.

The baseband circuitry 704 may include circuitry such as, but not limited to, one or more single-core or multi-core processors. The baseband circuitry 704 may include one or more baseband processors or control logic to process baseband signals received from a receive signal path of the RF circuitry 720 and to generate baseband signals for a transmit signal path of the RF circuitry 720. The baseband circuitry 704 may interface with the application circuitry 702 for generation and processing of the baseband signals and for controlling operations of the RF circuitry 720. For example, in some embodiments, the baseband circuitry 704 may include a third generation (3G) baseband processor (3G baseband processor 706), a fourth generation (4G) baseband processor (4G baseband processor 708), a fifth generation (5G) baseband processor (5G baseband processor 710), or other baseband processor(s) 712 for other existing generations, generations in development or to be developed in the future (e.g., second generation (2G), sixth generation (6G), etc.). The baseband circuitry 704 (e.g., one or more of baseband processors) may handle various radio control functions that enable communication with one or more radio networks via the RF circuitry 720. In other embodiments, some or all of the functionality of the illustrated baseband processors may be included in modules stored in the memory 718 and executed via a Central Processing Unit (CPU 714). The radio control functions may include, but are not limited to, signal modulation/demodulation, encoding/decoding, radio frequency shifting, etc. In some embodiments, modulation/demodulation circuitry of the baseband circuitry 704 may include Fast-Fourier Transform (FFT), precoding, or constellation mapping/demapping functionality. In some embodiments, encoding/decoding circuitry of the baseband circuitry 704 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 704 may include a digital signal processor (DSP), such as one or more audio DSP(s) 716. The one or more audio DSP(s) 716 may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 704 and the application circuitry 702 may be implemented together such as, for example, on a system on a chip (SOC).

In some embodiments, the baseband circuitry 704 may provide for communication compatible with one or more radio technologies. For example, in some embodiments, the baseband circuitry 704 may support communication with an evolved universal terrestrial radio access network (EUTRAN) or other wireless metropolitan area networks (WMAN), a wireless local area network (WLAN), or a wireless personal area network (WPAN). Embodiments in which the baseband circuitry 704 is configured to support radio communications of more than one wireless protocol may be referred to as multi-mode baseband circuitry.

The RF circuitry 720 may enable communication with wireless networks using modulated electromagnetic radiation through a non-solid medium. In various embodiments, the RF circuitry 720 may include switches, filters, amplifiers, etc. to facilitate the communication with the wireless network. The RF circuitry 720 may include a receive signal path which may include circuitry to down-convert RF signals received from the FEM circuitry 730 and provide baseband signals to the baseband circuitry 704. The RF circuitry 720 may also include a transmit signal path which may include circuitry to up-convert baseband signals provided by the baseband circuitry 704 and provide RF output signals to the FEM circuitry 730 for transmission. In some embodiments, the receive signal path of the RF circuitry 720 may include mixer circuitry 722, amplifier circuitry 724 and filter circuitry 726. In some embodiments, the transmit signal path of the RF circuitry 720 may include filter circuitry 726 and mixer circuitry 722. The RF circuitry 720 may also include synthesizer circuitry 728 for synthesizing a frequency for use by the mixer circuitry 722 of the receive signal path and the transmit signal path. In some embodiments, the mixer circuitry 722 of the receive signal path may be configured to down-convert RF signals received from the FEM circuitry 730 based on the synthesized frequency provided by synthesizer circuitry 728. The amplifier circuitry 724 may be configured to amplify the down-converted signals and the filter circuitry 726 may be a low-pass filter (LPF) or band-pass filter (BPF) configured to remove unwanted signals from the down-converted signals to generate output baseband signals. Output baseband signals may be provided to the baseband circuitry 704 for further processing. In some embodiments, the output baseband signals may be zero-frequency baseband signals, although this is not a requirement. In some embodiments, the mixer circuitry 722 of the receive signal path may comprise passive mixers, although the scope of the embodiments is not limited in this respect.

In some embodiments, the mixer circuitry 722 of the transmit signal path may be configured to up-convert input baseband signals based on the synthesized frequency provided by the synthesizer circuitry 728 to generate RF output signals for the FEM circuitry 730. The baseband signals may be provided by the baseband circuitry 704 and may be filtered by the filter circuitry 726.

In some embodiments, the mixer circuitry 722 of the receive signal path and the mixer circuitry 722 of the transmit signal path may include two or more mixers and may be arranged for quadrature downconversion and upconversion, respectively. In some embodiments, the mixer circuitry 722 of the receive signal path and the mixer circuitry 722 of the transmit signal path may include two or more mixers and may be arranged for image rejection (e.g., Hartley image rejection). In some embodiments, the mixer circuitry 722 of the receive signal path and the mixer circuitry 722 may be arranged for direct downconversion and direct upconversion, respectively. In some embodiments, the mixer circuitry 722 of the receive signal path and the mixer circuitry 722 of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 720 may include analog-to-digital converter (ADC) and digital-to-analog converter (DAC) circuitry and the baseband circuitry 704 may include a digital baseband interface to communicate with the RF circuitry 720.

In some dual-mode embodiments, a separate radio IC circuitry may be provided for processing signals for each spectrum, although the scope of the embodiments is not limited in this respect.

In some embodiments, the synthesizer circuitry 728 may be a fractional −N synthesizer or a fractional N/N+1 synthesizer, although the scope of the embodiments is not limited in this respect as other types of frequency synthesizers may be suitable. For example, synthesizer circuitry 728 may be a delta-sigma synthesizer, a frequency multiplier, or a synthesizer comprising a phase-locked loop with a frequency divider.

The synthesizer circuitry 728 may be configured to synthesize an output frequency for use by the mixer circuitry 722 of the RF circuitry 720 based on a frequency input and a divider control input. In some embodiments, the synthesizer circuitry 728 may be a fractional N/N+1 synthesizer.

In some embodiments, frequency input may be provided by a voltage controlled oscillator (VCO), although that is not a requirement. Divider control input may be provided by either the baseband circuitry 704 or the application circuitry 702 (such as an applications processor) depending on the desired output frequency. In some embodiments, a divider control input (e.g., N) may be determined from a look-up table based on a channel indicated by the application circuitry 702.

Synthesizer circuitry 728 of the RF circuitry 720 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 728 may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency ($f_{LO}$). In some embodiments, the RF circuitry 720 may include an IQ/polar converter.

The FEM circuitry 730 may include a receive signal path which may include circuitry configured to operate on RF signals received from one or more antennas 732, amplify the received signals and provide the amplified versions of the received signals to the RF circuitry 720 for further processing. The FEM circuitry 730 may also include a transmit signal path which may include circuitry configured to amplify signals for transmission provided by the RF circuitry 720 for transmission by one or more of the one or more antennas 732. In various embodiments, the amplification through the transmit or receive signal paths may be done solely in the RF circuitry 720, solely in the FEM circuitry 730, or in both the RF circuitry 720 and the FEM circuitry 730.

In some embodiments, the FEM circuitry 730 may include a TX/RX switch to switch between transmit mode and receive mode operation. The FEM circuitry 730 may include a receive signal path and a transmit signal path. The receive signal path of the FEM circuitry 730 may include an LNA to amplify received RF signals and provide the amplified received RF signals as an output (e.g., to the RF circuitry 720). The transmit signal path of the FEM circuitry 730 may include a power amplifier (PA) to amplify input RF signals (e.g., provided by the RF circuitry 720), and one or more filters to generate RF signals for subsequent transmission (e.g., by one or more of the one or more antennas 732).

In some embodiments, the PMC 734 may manage power provided to the baseband circuitry 704. In particular, the PMC 734 may control power-source selection, voltage scaling, battery charging, or DC-to-DC conversion. The PMC 734 may often be included when the device 700 is capable of being powered by a battery, for example, when the device 700 is included in a EGE. The PMC 734 may increase the power conversion efficiency while providing desirable implementation size and heat dissipation characteristics.

FIG. 7 shows the PMC 734 is coupled only with the baseband circuitry 704. However, in other embodiments, the PMC 734 may be additionally or alternatively coupled with, and perform similar power management operations for, other components such as, but not limited to, the application circuitry 702, the RF circuitry 720, or the FEM circuitry 730.

In some embodiments, the PMC 734 may control, or otherwise be part of, various power saving mechanisms of the device 700. For example, if the device 700 is in an RRC Connected state, where it is still connected to the RAN node as it expects to receive traffic shortly, then it may enter a state known as Discontinuous Reception Mode (DRX) after a period of inactivity. During this state, the device 700 may power down for brief intervals of time and thus save power.

If there is no data traffic activity for an extended period of time, then the device 700 may transition off to an RRC Idle state, where it disconnects from the network and does not perform operations such as channel quality feedback, handover, etc. The device 700 goes into a very low power state and it performs paging where again it periodically wakes up to listen to the network and then powers down again. The device 700 may not receive data in this state, and in order to receive data, it transitions back to an RRC Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 702 and processors of the baseband circuitry 704 may be used to execute elements of one or more instances of a protocol stack. For example, processors of the baseband circuitry 704, alone or in combination, may be used to execute Layer 3, Layer 2, or Layer 1 functionality, while processors of the application circuitry 702 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 8:
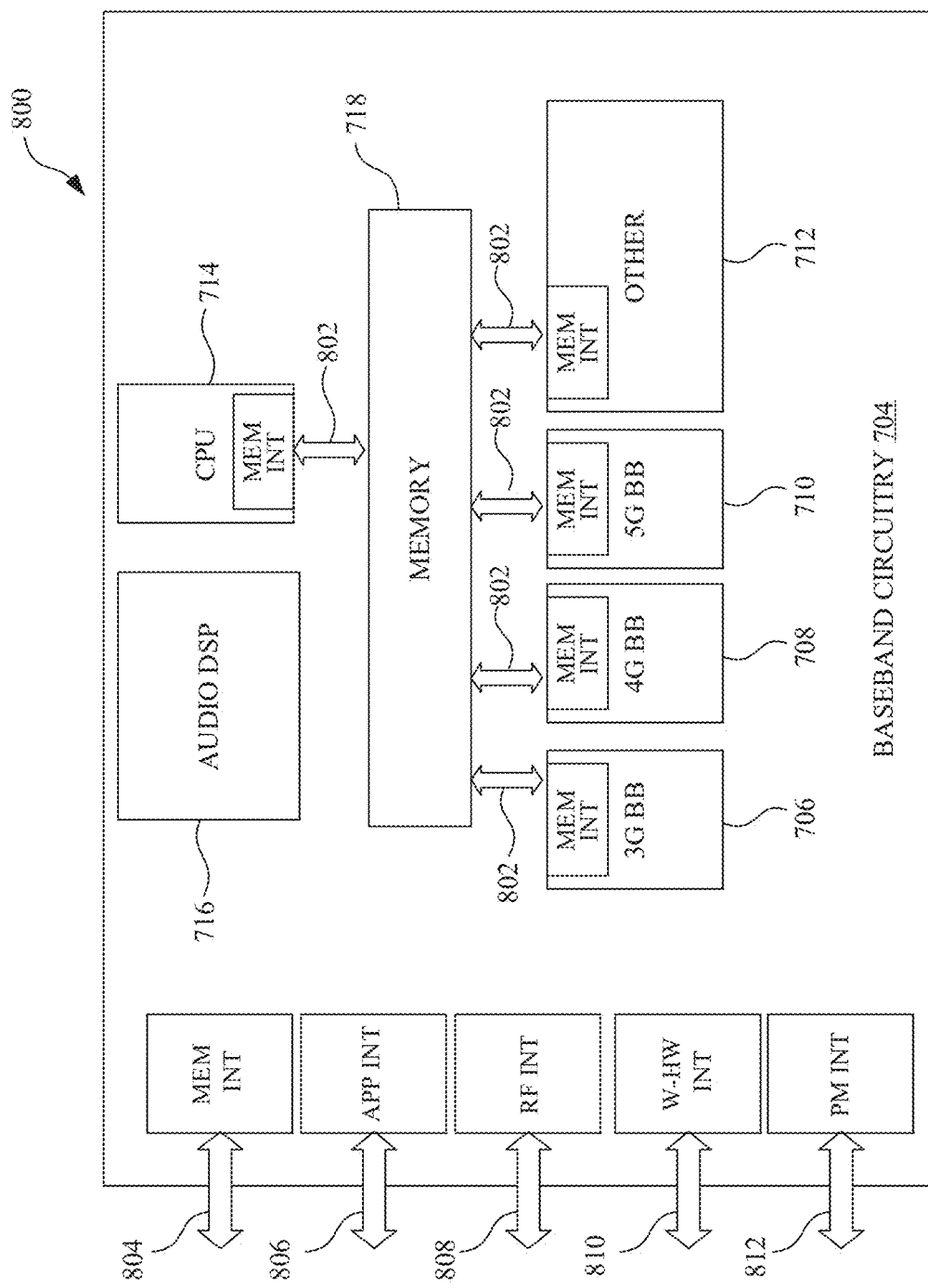
FIG. 8 illustrates exemplary interfaces of baseband circuitry in accordance with some embodiments.

FIG. 8 illustrates example interfaces 800 of baseband circuitry in accordance with some embodiments. As discussed above, the baseband circuitry 704 of FIG. 5 may comprise 3G baseband processor 706, 4G baseband processor 708, 5G baseband processor 710, other baseband processor(s) 712, CPU 714, and a memory 718 utilized by said processors. As illustrated, each of the processors may include a respective memory interface 802 to send/receive data to/from the memory 718.

The baseband circuitry 704 may further include one or more interfaces to communicatively couple to other circuitries/devices, such as a memory interface 804 (e.g., an interface to send/receive data to/from memory external to the baseband circuitry 704), an application circuitry interface 806 (e.g., an interface to send/receive data to/from the application circuitry 702 of FIG. 7), an RF circuitry interface 808 (e.g., an interface to send/receive data to/from RF circuitry 720 of FIG. 7), a wireless hardware connectivity interface 810 (e.g., an interface to send/receive data to/from Near Field Communication (NFC) components, Bluetooth® components (e.g., Bluetooth® Low Energy), Wi-Fi® components, and other communication components), and a power management interface 812 (e.g., an interface to send/receive power or control signals to/from the PMC 734.

Figure 9:
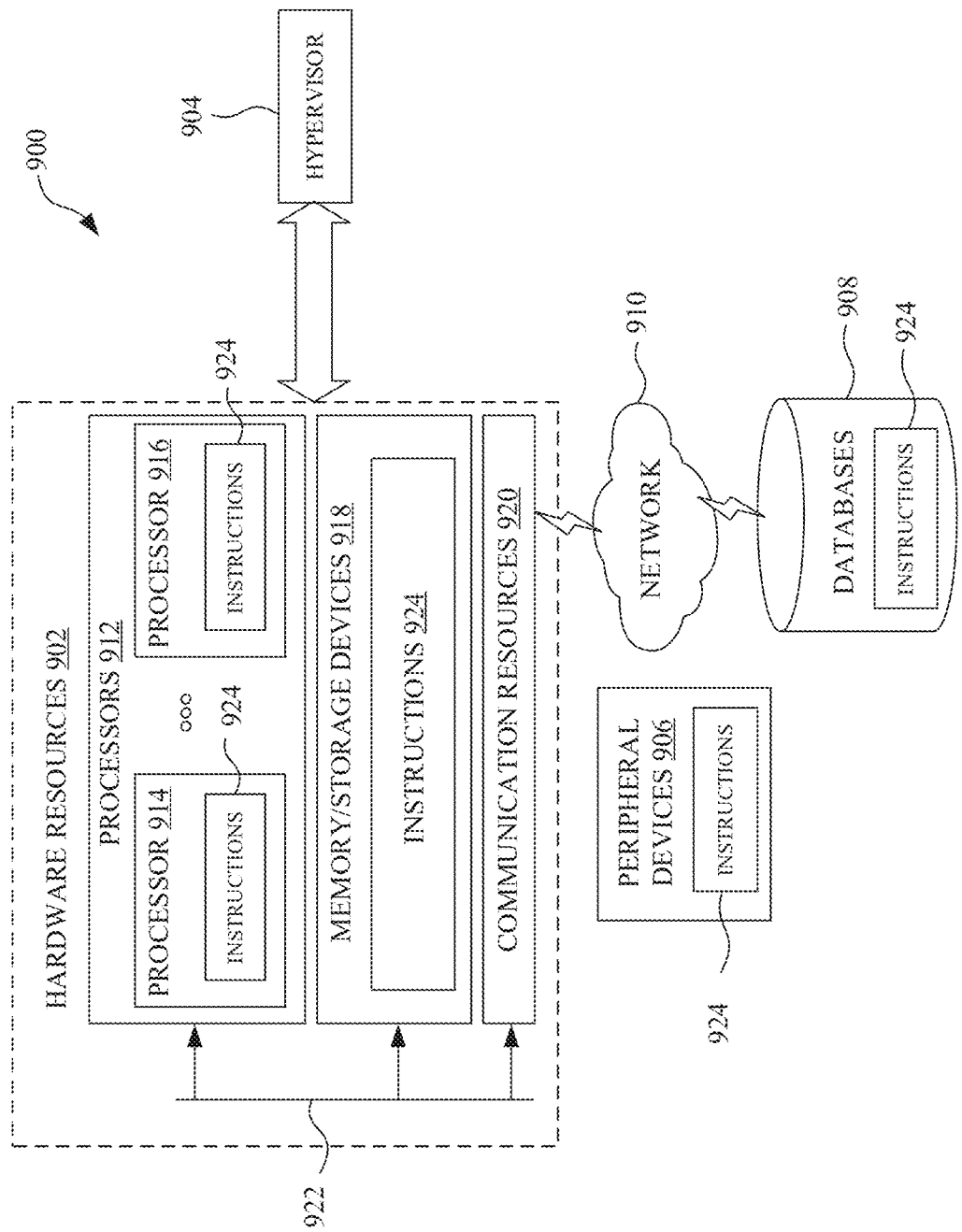
FIG. 9 illustrates components in accordance with some embodiments.

FIG. 9 is a block diagram illustrating components 900, according to some example embodiments, able to read instructions from a machine-readable or computer-readable medium (e.g., a non-transitory machine-readable storage medium) and perform any one or more of the methodologies discussed herein. Specifically, FIG. 9 shows a diagrammatic representation of hardware resources 902 including one or more processors 912 (or processor cores), one or more memory/storage devices 918, and one or more communication resources 920, each of which may be communicatively coupled via a bus 922. For embodiments where node virtualization (e.g., NFV) is utilized, a hypervisor 904 may be executed to provide an execution environment for one or more network slices/sub-slices to utilize the hardware resources 902.

The processors 912 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 914 and a processor 916.

The memory/storage devices 918 may include main memory, disk storage, or any suitable combination thereof. The memory/storage devices 918 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 920 may include interconnection or network interface components or other suitable devices to communicate with one or more peripheral devices 906 or one or more databases 908 via a network 910. For example, the communication resources 920 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 924 may comprise software, a program, an application, an applet, an app, or other executable code for causing at least any of the processors 912 to perform any one or more of the methodologies discussed herein. The instructions 924 may reside, completely or partially, within at least one of the processors 912 (e.g., within the processor's cache memory), the memory/storage devices 918, or any suitable combination thereof. Furthermore, any portion of the instructions 924 may be transferred to the hardware resources 902 from any combination of the peripheral devices 906 or the databases 908. Accordingly, the memory of the processors 912, the memory/storage devices 918, the peripheral devices 906, and the databases 908 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Figure 10:
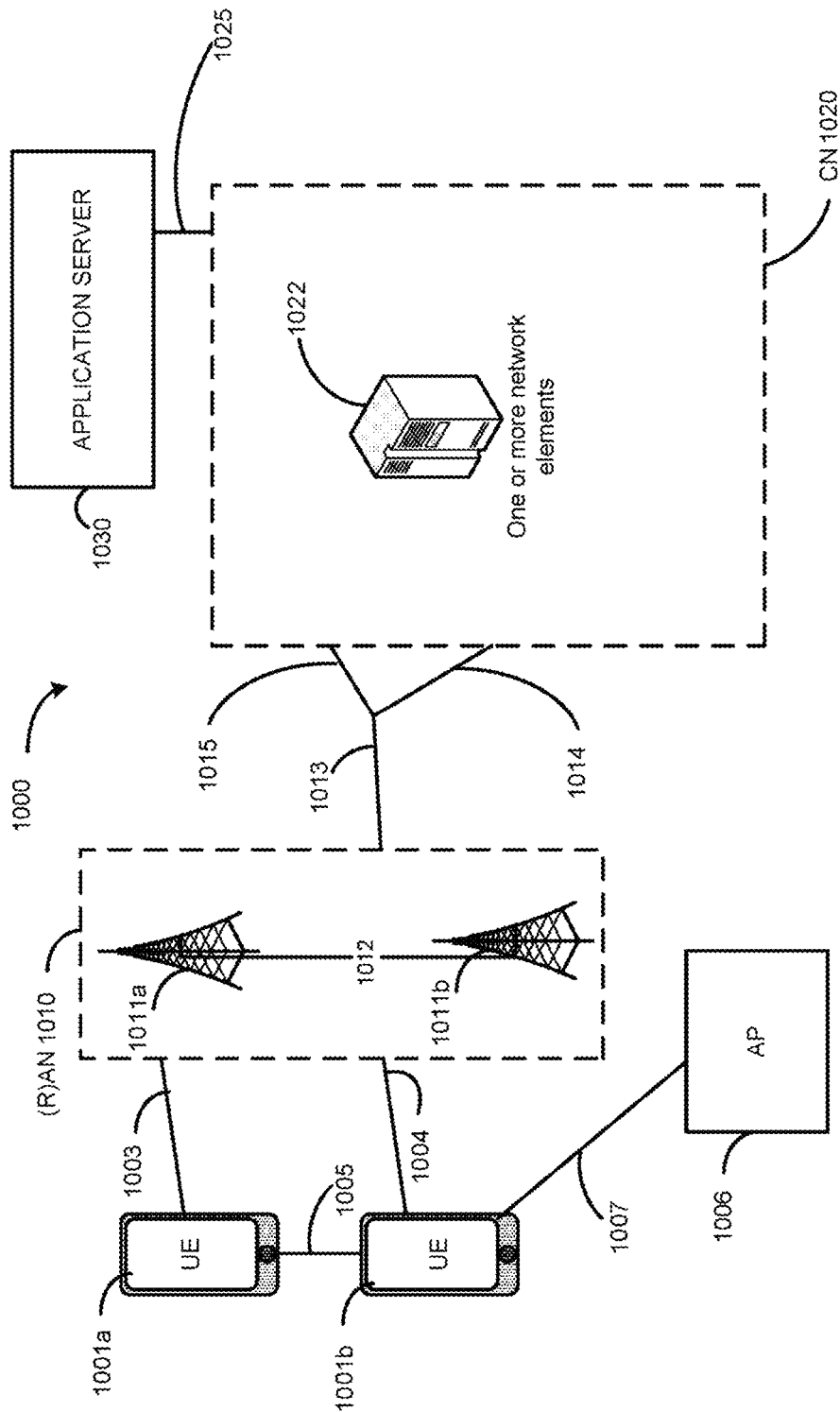
FIG. 10 illustrates an architecture of a wireless network in accordance with some embodiments.

FIG. 10 illustrates an architecture of a system 1000 of a network in accordance with some embodiments. The following description is provided for an example system 1000 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems), or the like.

As shown by FIG. 10, the system 1000 includes UE 1001a and UE 1001b (collectively referred to as "UEs 1001" or "UE 1001"). The UE 1001a and/or UE 1001b may correspond to the UEs described above.

In this example, UEs 1001 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, any of the UEs 1001 may be IoT UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 1001 may be configured to connect, for example, communicatively couple, with an or RAN 1010. In embodiments, the RAN 1010 may be an NG RAN or a 5G RAN, an E-UTRAN, or a legacy RAN, such as a UTRAN or GERAN. As used herein, the term "NG RAN" or the like may refer to a RAN 1010 that operates in an NR or 5G system 1000, and the term "E-UTRAN" or the like may refer to a RAN 1010 that operates in an LTE or 4G system 1000. The UEs 1001 utilize connections (or channels) 1003 and 1004, respectively, each of which comprises a physical communications interface or layer (discussed in further detail below).

In this example, the connections 1003 and 1004 are illustrated as an air interface to enable communicative coupling, and can be consistent with cellular communications protocols, such as a GSM protocol, a CDMA network protocol, a PTT protocol, a POC protocol, a UMTS protocol, a 3 GPP LTE protocol, a 5G protocol, a NR protocol, and/or any of the other communications protocols discussed herein. In embodiments, the UEs 1001 may directly exchange communication data via a ProSe interface 1005. The ProSe interface 1005 may alternatively be referred to as a SL interface 1005 and may comprise one or more logical channels, including but not limited to a PSCCH, a PSSCH, a PSDCH, and a PSBCH.

The UE 1001b is shown to be configured to access an AP 1006 (also referred to as "WLAN node 1006", "WLAN 1006", "WLAN Termination 1006", "WT 1006" or the like) via connection 1007. The connection 1007 can comprise a local wireless connection, such as a connection consistent with any IEEE 802.11 protocol, wherein the AP 1006 would comprise a wireless fidelity (Wi-Fi®) router. In this example, the AP 1006 is shown to be connected to the Internet without connecting to the core network of the wireless system (described in further detail below). In various embodiments, the UE 1001b, RAN 1010, and AP 1006 may be configured to utilize LWA operation and/or LWIP operation. The LWA operation may involve the UE 1001b in RRC CONNECTED being configured by a RAN node 1011a-b to utilize radio resources of LTE and WLAN. LWIP operation may involve the UE 1001b using WLAN radio resources (e.g., connection 1007) via IPsec protocol tunneling to authenticate and encrypt packets (e.g., IP packets) sent over the connection 1007. IPsec tunneling may include encapsulating the entirety of original IP packets and adding a new packet header, thereby protecting the original header of the IP packets.

The RAN 1010 can include one or more AN nodes or RAN nodes 1011a and 1011b (collectively referred to as "RAN nodes 1011" or "RAN node 1011") that enable the connections 1003 and 1004. As used herein, the terms "access node", "access point" or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 1011 that operates in an NR or 5G system 1000 (for example, a gNB), and the term "E-UTRAN node" or the like may refer to a RAN node 1011 that operates in an LTE or 4G system 1000 (e.g., an eNB). According to various embodiments, the RAN nodes 1011 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN nodes 1011 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes 1011; a MAC/

PHY split wherein RRC, PDCP, RLC, and MAC layers are operated by the CRAN/vBBUP and the PHY layer is operated by individual RAN nodes 1011; or a "lower PHY" split wherein RRC, PDCP, RLC, MAC layers and upper portions of the PHY layer are operated by the CRAN/vBBUP and lower portions of the PHY layer are operated by individual RAN nodes 1011. This virtualized framework allows the freed-up processor cores of the RAN nodes 1011 to perform other virtualized applications. In some implementations, an individual RAN node 1011 may represent individual gNB-DUs that are connected to a gNB-CU via individual FI interfaces (not shown by FIG. 10). In these implementations, the gNB-DUs may include one or more remote radio heads or RFEMs, and the gNB-CU may be operated by a server that is located in the RAN 1010 (not shown) or by a server pool in a similar manner as the CRAN/vBBUP. Additionally or alternatively, one or more of the RAN nodes 1011 may be next generation eNBs (ng-eNBs), which are RAN nodes that provide E-UTRA user plane and control plane protocol terminations toward the UEs 1001, and are connected to a 5G core (5GC) via an NG interface.

In V2X scenarios one or more of the RAN nodes 1011 may be or act as RSUs. The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs 1001 (vUEs 1001). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) and/or provide connectivity to one or more cellular networks to provide uplink and downlink communications. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller and/or a backhaul network.

Any of the RAN nodes 1011 can terminate the air interface protocol and can be the first point of contact for the UEs 1001. In some embodiments, any of the RAN nodes 1011 can fulfill various logical functions for the RAN 1010 including, but not limited to, radio network controller (RNC) functions such as radio bearer management, uplink and downlink dynamic radio resource management and data packet scheduling, and mobility management.

In embodiments, the UEs 1001 can be configured to communicate using OFDM communication signals with each other or with any of the RAN nodes 1011 over a multi carrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 1011 to the UEs 1001, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UEs 1001 and the RAN nodes 1011 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UEs 1001 and the RAN nodes 1011 may operate using LAA, eLAA, and/or feLAA mechanisms. In these implementations, the UEs 1001 and the RAN nodes 1011 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 1001, RAN nodes 1011 etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 1001, AP 1006, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (ps); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 1001 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UEs 1001. The PDCCH carries information about the transport format and resource allocations related to the PDSCH channel, among other things. It may also inform the UEs 1001 about the transport format, resource allocation, and HARQ information related to the uplink shared channel. Typically, downlink scheduling (assigning control and shared channel resource blocks to the UE 1001b within a cell) may be performed at any of the RAN nodes 1011 based on channel quality information fed back from any of the UEs 1001. The downlink resource assignment information may be sent on the PDCCH used for (e.g., assigned to) each of the UEs 1001.

The PDCCH uses control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to six resource element groups (REGs). Each REG comprises one resource block in one OFDM symbol. The PDCCH can be transmitted using one or more CCEs, depending on the size of the downlink control information (DCI) and the channel condition. Different numbers of CCEs (e.g., aggregation level, L=1, 2, 4, 8 or 16) can be used for transmission of the PDCCH.

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN nodes 1011 may be configured to communicate with one another via interface 1012. In embodiments where the system 1000 is an LTE system (e.g., when CN 1020 is an EPC), the interface 1012 may be an X2 interface 1012. The X2 interface may be defined between two or more RAN nodes 1011 (e.g., two or more eNBs and the like) that connect to EPC 1020, and/or between two eNBs connecting to EPC 1020. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 1001 from an SeNB for user data; information of PDCP PDUs that were not delivered to a UE 1001; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality. In embodiments where the system 1000 is a 5G or NR system (e.g., when CN 1020 is an 5GC), the interface 1012 may be an Xn interface 1012. The Xn interface is defined between two or more RAN nodes 1011 (e.g., two or more gNBs and the like) that connect to 5GC 1020, between a RAN node 1011 (e.g., a gNB) connecting to 5GC 1020 and an eNB, and/or between two eNBs connecting to 5GC 1020. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 1001 in a connected mode (e.g., CM-CONNECTED) including functionality to manage the UE mobility for connected mode between one or more RAN nodes 1011. The mobility support may include context transfer from an old (source) serving RAN node 1011 to new (target) serving RAN node 1011; and control of user plane tunnels between old (source) serving RAN node 1011 to new (target) serving RAN node 1011. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 1010 is shown to be communicatively coupled to a core network—in this embodiment, core network (CN) 1020. The CN 1020 may comprise a plurality of network elements 1022, which are configured to offer various data and telecommunications services to customers/subscribers (e.g., users of UEs 1001) who are connected to the CN 1020 via the RAN 1010. The components of the CN 1020 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 1020 may be referred to as a network slice, and a logical instantiation of a portion of the CN 1020 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 1030 may be an element offering applications that use IP bearer resources with the core network (e.g., UMTS PS domain, LTE PS data services, etc.). The application server 1030 can also be configured to support one or more communication services (e.g., VoIP sessions, PTT sessions, group communication sessions, social networking services, etc.) for the UEs 1001 via the EPC 1020.

In embodiments, the CN 1020 may be a 5GC (referred to as "5GC 1020" or the like), and the RAN 1010 may be connected with the CN 1020 via an NG interface 1013. In embodiments, the NG interface 1013 may be split into two parts, an NG user plane (NG-U) interface 1014, which carries traffic data between the RAN nodes 1011 and a UPF, and the SI control plane (NG-C) interface 1015, which is a signaling interface between the RAN nodes 1011 and AMFs.

In embodiments, the CN 1020 may be a 5G CN (referred to as "5GC 1020" or the like), while in other embodiments, the CN 1020 may be an EPC). Where CN 1020 is an EPC (referred to as "EPC 1020" or the like), the RAN 1010 may be connected with the CN 1020 via an SI interface 1013. In embodiments, the SI interface 1013 may be split into two parts, an SI user plane (SI-U) interface 1014, which carries traffic data between the RAN nodes 1011 and the S-GW, and the SI -MME interface 1015, which is a signaling interface between the RAN nodes 1011 and MMEs.

Additional Examples

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

The following examples pertain to further embodiments.

Example 1 is a method for a user equipment (UE), comprising: performing, based on a command for a handover (HO) with a primary secondary cell (PSCell), an HO of a target primary cell (PCell) and an addition of a target PSCell; adjusting a radio frequency (RF) for the HO of the target PCell according to a reference signal (RS) occasion for the HO of the target PCell, and an RF for the addition of the target PSCell according to an RS occasion for the addition of the target PSCell.

Example 2 is the method of Example 1, wherein the HO of the target PCell and the addition of the target PSCell are performed sequentially, and wherein the UE adjusts the RF for the addition of the target PSCell after the HO of the target PCell is completed.

Example 3 is the method of Example 2, wherein the UE adjusts the RF for the addition of the target PSCell prior to a first available RS occasion for the addition of the target PSCell.

Example 4 is the method of Example 2, wherein the UE adjusts the RF for the addition of the target PSCell before a random access channel (RACH) transmission of the target PSCell where a predetermined number of the RS occasion for the addition of the target PSCell have been measured.

Example 5 is the method of Example 1, wherein the HO of the target PCell and the addition of the target PSCell are performed in parallel, and wherein the UE adjusts the RF for the HO of the target PCell during a time period of the HO of the target PCell and the RF for the addition of the target PSCell during a time period of the addition of the target PSCell.

Example 6 is the method of Example 5, wherein the UE adjusts the RF for the addition of the target PSCell during the time period of the addition of the target PSCell, prior to a first available RS occasion for the addition of the target PSCell after the command for the HO is processed.

Example 7 is the method of Example 6, wherein, when a time duration in which the UE adjusts the RF for the addition of the target PSCell collides with at least one RS occasion for the HO of the target PCell such that the at least one RS occasion for the HO of the target PCell is interrupted, the time period of the HO of the target PCell is to be extended.

Example 8 is the method of Example 7, wherein, the time period of the HO of the target PCell is to be extended for at least one RS occasion.

Example 9 is the method of Example 6, wherein, when no RS occasion for the HO of the target PCell is interrupted by the adjustment of the RF for the addition of the target PSCell, the time period of the HO of the target PCell is not to be extended.

Example 10 is the method of Example 6, wherein, when the UE adjusts the RF for the addition of the target PSCell after the HO of the target PCell is completed, the UE interrupts a data channel and/or control channel on the target PCell within a time duration in which the UE adjusts the RF for the addition of the target PSCell.

Example 11 is the method of Example 5, wherein the UE adjusts the RF for the HO of the target PCell and the RF for the addition of the target PSCell in an aligned manner in the time domain.

Example 12 is the method of Example 11, wherein the UE adjusts the RF for the HO of the target PCell and the RF for the addition of the target PSCell simultaneously, prior to an earlier one of a first available RS occasion for the HO of the target PCell and a first available RS occasion for the addition of the target PSCell after the command for the HO is processed.

Example 13 is the method of Example 11, wherein the UE adjusts the RF for the HO of the target PCell and the RF for the addition of the target PSCell simultaneously, prior to a time point which is a first overlapping between the RS occasion for the HO of the target PCell and the RS occasion for the addition of the target PSCell in the time domain.

Example 14 is the method of Example 1, wherein the UE adjusts the RF for the HO of the target PCell to perform at least one of tuning or retuning an RF chain, powering on an RF chain and widening a coverage of the RF in the frequency domain to contain the RS occasion for the target PCell, and wherein the UE adjusts the RF for the addition of the target PSCell to perform at least one of tuning or retuning an RF chain, powering on an RF chain and widening a coverage of the RF in the frequency domain to contain the RS occasion for the target PSCell.

Example 15 is an apparatus for a user equipment (UE), the apparatus comprising: one or more processors configured to perform steps of the method according to any of Example 1-14.

Example 16 is a computer readable medium having computer programs stored thereon which, when executed by one or more processors, cause an apparatus to perform steps of the method according to any of Example 1-14.

Example 17 is an apparatus for a communication device, comprising means for performing steps of the method according to any of Example 1-14.

Example 18 is a computer program product comprising computer programs which, when executed by one or more processors, cause an apparatus to perform steps of the method according to any of Example 1-14.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. One or more non-transitory, computer-readable media having instructions that, when executed, cause processor circuitry to:
  receive a command to handover (HO) with a primary secondary cell (PSCell);
  perform, based on the command, a primary cell (PCell) HO operation within a first time period from reception of the command; and
  perform, based on the command, a PSCell addition or change operation within a second time period from reception of the command,
  wherein the first time period at least partially overlaps the second time period, the first time period includes a first radio frequency (RF) adjustment period, and the second time period includes a second RF adjustment period that is aligned with the first RF adjustment period in a time domain.

2. The one or more non-transitory, computer-readable media of claim 1, wherein:
  to perform the PCell HO operation, the UE is to adjust a first RF within the first RF adjustment period; and
  to perform the PSCell addition or change operation, the UE is to adjust a second RF within the second RF adjustment period.

3. The one or more non-transitory, computer-readable media of claim 2, wherein the UE is to adjust the first RF and the second RF before a reference signal (RS) occasion for the PCell HO operation that is to occur within the first time period and before an RS occasion for the PSCell addition or change operation that is to occur within the second time period.

4. The one or more non-transitory, computer-readable media of claim 2, wherein the UE is to adjust the first RF and the second RF before a time point that is a first overlapping between a reference signal (RS) occasion for the PCell HO operation and an RS occasion for the PSCell addition or change operation in a time domain.

5. The one or more non-transitory, computer-readable media of claim 1, wherein the instructions, when executed, further cause the UE to:
  adjust an RF to perform the PSCell addition or change operation;
  measure, after adjustment of the RF, a predetermined number of reference signal (RS) occasions associated with a target PSCell; and generate a random access channel (RACH) transmission, the RACH transmission to be transmitted, to the target PSCell, after measurement of the predetermined number of RS occasions.

6. The one or more non-transitory, computer-readable media of claim 5, wherein to measure the predetermined number of RS occasions, the UE is to:
measure synchronization signal blocks transmitted by the target PSCell in the predetermined number of RS occasions.

7. The one or more non-transitory, computer-readable media of claim 1, wherein the instructions, when executed, further cause the UE to:
adjust an RF to perform the PCell HO operation;
measure, after adjustment of the RF, a predetermined number of reference signal (RS) occasions associated with a target PCell; and
complete the PCell HO operation based on measurement of the predetermined number of RS occasions.

8. The one or more non-transitory, computer-readable media of claim 7, wherein to measure the predetermined number of RS occasions, the UE is to:
measure synchronization signal blocks transmitted by the target PCell in the predetermined number of RS occasions.

9. A method comprising:
receiving a command to handover (HO) with a primary secondary cell (PSCell);
performing, based on the command, a primary cell (PCell) HO operation within a first time period from reception of the command; and
performing, based on the command, a PSCell addition or change operation within a second time period from reception of the command,
wherein the first time period at least partially overlaps the second time period, the first time period includes a first radio frequency (RF) adjustment period, and the second time period includes a second RF adjustment period that is aligned with the first RF adjustment period in a time domain.

10. The method of claim 9, wherein:
performing the PCell HO operation includes adjusting a first RF within the first RF adjustment period; and
performing the PSCell addition or change operation includes adjusting a second RF within the second RF adjustment period.

11. The method of claim 10, further comprising:
adjusting the first RF and the second RF before a reference signal (RS) occasion for the PCell HO operation occurs within the first time period and before an RS occasion for the PSCell addition or change operation occurs within the second time period.

12. The method of claim 10, further comprising:
adjusting the first RF and the second RF before a time point which is a first overlapping between a reference signal (RS) occasion for the PCell HO operation and a RS occasion for the PSCell addition or change operation in a time domain.

13. The method of claim 10, further comprising:
adjusting an RF to perform the PSCell addition or change operation;

measuring, after adjusting the RF, a predetermined number of reference signal (RS) occasions associated with a target PSCell; and
generating a random access channel (RACH) transmission, the RACH transmission to be transmitted, to the target PSCell, after measuring the predetermined number of RS occasions.

14. The method of claim 13, wherein measuring the predetermined number of RS occasions comprises:
measuring synchronization signal blocks transmitted by the target PSCell in the predetermined number of RS occasions.

15. The method of claim 10, further comprising:
adjusting an RF to perform the PCell HO operation;
measuring, after adjusting the RF, a predetermined number of reference signal (RS) occasions associated with a target PCell; and
completing the PCell HO operation based on measuring the predetermined number of RS occasions.

16. The method of claim 15, wherein measuring the predetermined number of RS occasions comprises:
measuring synchronization signal blocks transmitted by the target PCell in the predetermined number of RS occasions.

17. An apparatus comprising:
interface circuitry; and
processing circuitry, coupled with the interface circuitry, the processing circuitry to:
receive a command to handover (HO) with a primary secondary cell (PSCell);
perform, based on the command, a primary cell (PCell) HO operation within a first time period from reception of the command; and
perform, based on the command, a PSCell addition or change operation within a second time period from reception of the command,
wherein the first time period at least partially overlaps the second time period, the first time period includes a first radio frequency (RF) adjustment period, and the second time period includes a second RF adjustment period that is aligned with the first RF adjustment period in a time domain.

18. The apparatus of claim 17, wherein:
to perform the PCell HO operation, the processing circuitry is to adjust a first RF within the first RF adjustment period; and
to perform the PSCell addition or change operation, the processing circuitry is to adjust a second RF within the second RF adjustment period.

19. The apparatus of claim 18, wherein the processing circuitry is to adjust the first RF and the second RF before a reference signal (RS) occasion for the PCell HO operation that is to occur within the first time period and before an RS occasion for the PSCell addition or change operation that is to occur within the second time period.

20. The apparatus of claim 18, wherein the processing circuitry is to adjust the first RF and the second RF before a time point which is a first overlapping between a reference signal (RS) occasion for the PCell HO operation and a RS occasion for the PSCell addition or change operation in a time domain.

* * * * *